July 4, 1967     B. DEVIN     3,329,839
THERMOELECTRONIC ENERGY CONTAINERS FOR NUCLEAR REACTORS
Filed Aug. 28, 1964     2 Sheets-Sheet 1

Inventor:
Bernard DEVIN
by: J. Delattre Seguy
Attorney

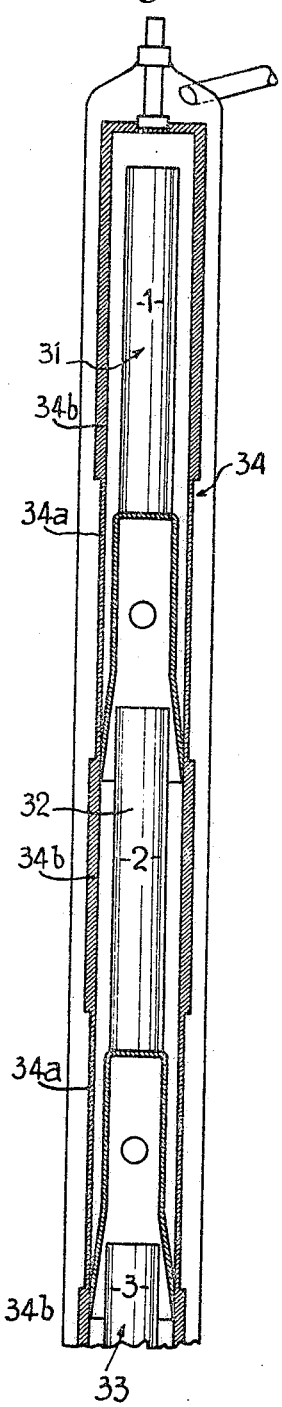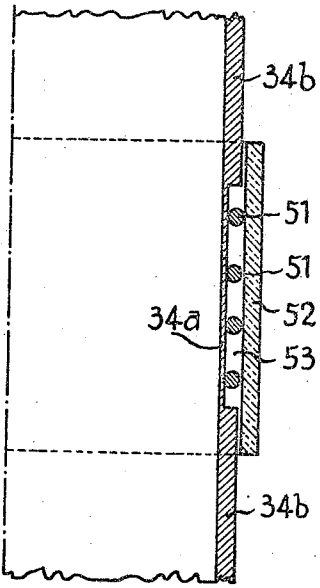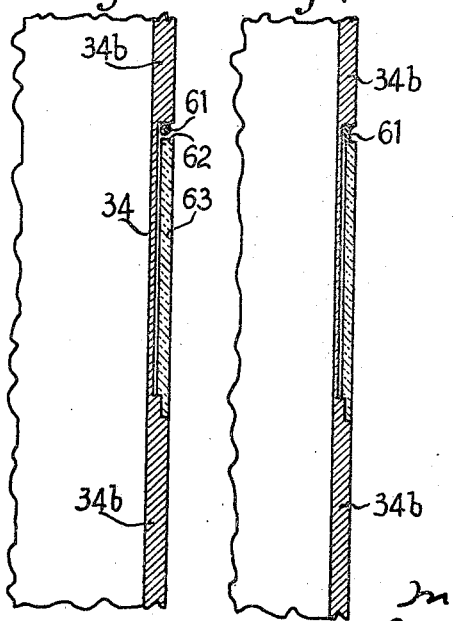

United States Patent Office 3,329,839
Patented July 4, 1967

3,329,839
THERMOELECTRONIC ENERGY CONTAINERS FOR NUCLEAR REACTORS
Bernard Devin, Rueil-Malmaison, France, assignor to Commissariat a l'Energie Atomique, Paris, France, a corporation of France
Filed Aug. 28, 1964, Ser. No. 392,819
Claims priority, application France, Sept. 3, 1963, 946,397
10 Claims. (Cl. 310—4)

The conversion of nuclear fission energy into electricity is achieved by, among other means, plasma diodes which are still termed thermionic or thermoelectronic converters. These devices are well known. The devices comprise a hot electron-emitting electrode separated from a cold electron-collecting electrode by a gap which is devoid of air and is usually filled with a cesium vapour which insures the neutralization of the space charge.

The output voltage of each diode is at the most of the order of 1 volt, which in practice requires the series connection of numerous elements to obtain a convenient overall output voltage. In the particular case of a nuclear reactor, several diodes are grouped into a bar or rod structure.

Such a known arrangement is shown in FIG. 1 of the accompanying drawing, which is an axial sectional view of a thermoelectronic energy converter of known type and in which are shown the elements constituted by nuclear fuel bars 1, 2, 3; each of these bars can comprise a cathode sleeve 4 and is supported by a conductive base 5 which is electrically connected to a cylinder 6 constituting the anode which collects the electrons emitted by the preceding element.

The heat which is created at the anode is evacuated by a cooling fluid circulating in a space 7 provided between the anodes 6 and an outer case 8 provided with an inlet orifice 9 and an outlet orifice 10 so that this space can be inserted in a pump circuit suitable for the nature of the fluid. This fluid is chosen as a function of the temperature of the anode. In respect of nuclear applications, it is advantageously composed of a molten metal such as Li, Na, K or mixtures of molten metals.

The space 11 between each anode and the fuel bar, which can be if desired sheathed, is occupied by a cesium vapour at a pressure between about $10^{-3}$ and 5 millimeters of mercury.

This vapour is supplied by a mass 12 of cesium disposed in a reservoir 13 which is located outside the case 8 and communicates with the space 11 by way of a tube 14 which can be formed by either of two electric connections 15 and 16 which conduct outside the case 8 the electric current produced by the diodes 1, 2 and 3. These passages are suitably insulated from the case for example by a ceramic joint 17.

Orifices 18 provided in the bases 5 insure that the spaces 11 of the diodes 1, 2 and 3 communicate with each other and the continuity of the atmosphere occupying the spaces.

The single chamber 11a thus formed by all the spaces 11 is externally defined by the anodes 6 and insulating rings 19 which connect these anodes together in a sealed manner.

The function of these rings 19 is double, namely they result in a physical continuity between the successive anodes in rendering the single chamber 11a fluidtight and, further, they insulate each anode from the adjacent anodes in such manner that the current produced by the element 2, for example, does not close onto itself or short-circuit in the path represented by the arrow 21.

Said insulation rings 19 employed in a conventional manner in the known device shown in FIG. 1 and in FIG. 2 on an enlarged scale and described hereinbefore are necessarily composed of a refractory ceramic such as for example alumina or thoria and they are connected to the anodes by means of metal and ceramic brazing in accordance with the known technique or by forming-over operations.

This structure has certain drawbacks and in particular the following:

(1) At the operational temperature (500–1000° C.) the brazing metal is corroded by the cesium vapours and the ceramic itself can deteriorate under the combined action of the nuclear radiation and the alkali vapour present in the enclosure.

(2) The bar of the nuclear reactor, formed by an anode tube composed of a series of anodes and a series of insulating rings, is fragile and requires special precautions when handling owing to the nature of the fuel contained in the anode tube.

The object of the present invention is to avoid these drawbacks.

The invention provides a thermoelectronic energy converter which is of the known general type referred to hereinbefore and comprises a series of nuclear fuel bars disposed in an anode tube which is coaxial and is composed of metallic cylindrical anodes connected together in a fluidtight manner by connecting rings, wherein said rings are composed not of ceramic, as is conventional, but of metal. The electrical insulation required between the anodes is low since the difference of potential between successive anodes is no more than around 1 volt. Consequently, a current of electrons will circulate in the proposed metal ring in the direction of arrow 21 and will correspond to a low potential difference, that is, a weak current. The latter can be rendered negligible with respect to the total current produced by the converter by constructing each of said rings in such manner that it has in the axial direction an appropriate electrical resistance.

According to another feature of the invention, each of said metal rings has an annular zone which is sufficiently thin to impart to the ring in the axial direction an electrical resistance of such magnitude that it restricts to within acceptable limits the short-circuiting current travelling in the direction of arrow 21.

In this way there is obtained an entirely metallic reactor bar with all the corresponding advantages, for example strength, stability, resistance to corrosion, fluidtightness and ease of maintenance.

Further features and advantages of the invention will be apparent from the ensuing description, with reference to the accompanying drawings to which the invention is in no way limited.

FIG. 4 is an axial sectional view similar to FIG. 1 of a portion of the improved thermoelectronic apparatus according to the invention, and FIGS. 5, 6 and 7 are axial sectional views, on an enlarged scale with respect to FIG. 1, of portions of anode tubes according to variants of the invention.

Figure 1:
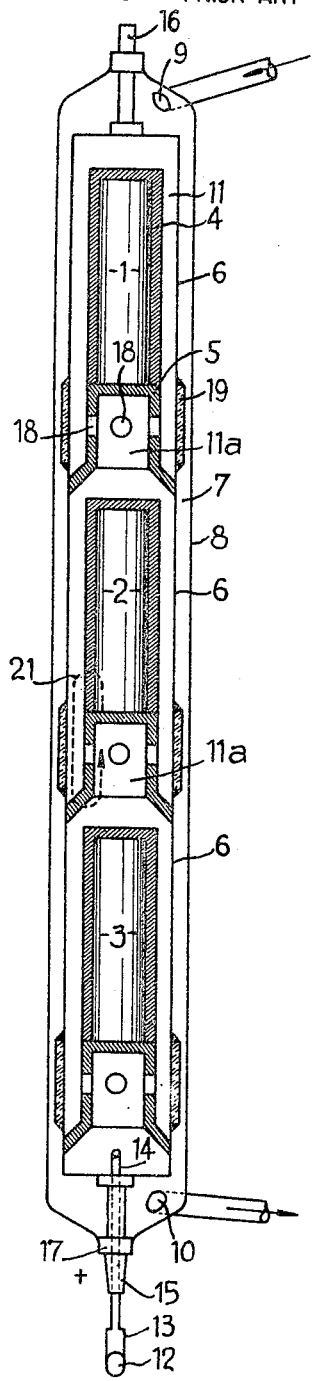
FIGS. 1 and 2 show a known type of thermoelectronic converter whose structure is referred to hereinbefore.
Figure 2:
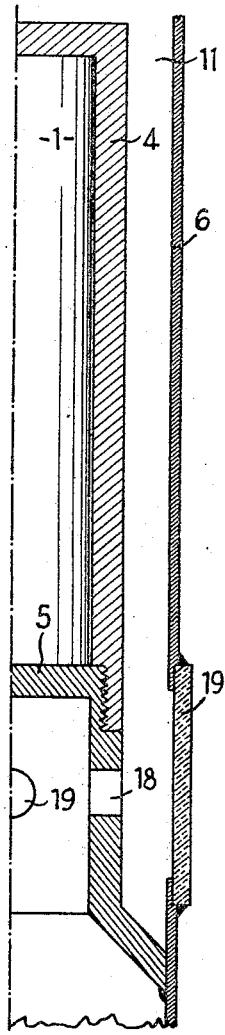
Figure 3:
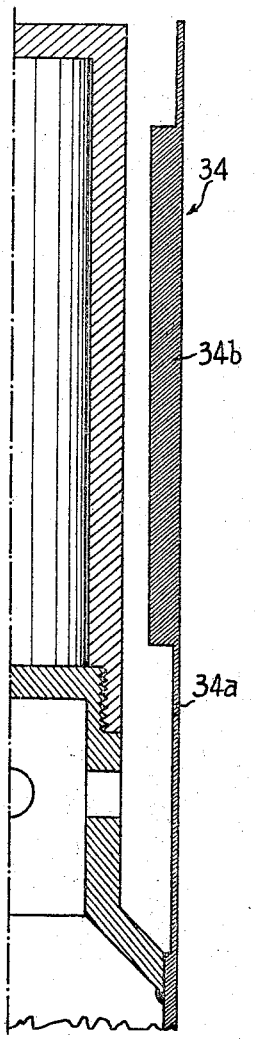
FIG. 3 is an axial sectional view similar to FIG. 2 of a bar and a portion of the improved anode tube according to the invention.

In the embodiment shown in FIGS. 3 and 4, the bar of the nuclear reactor comprises three diodes 31, 32, 33 electrically connected in series in an anode 34 common to these three diodes. The elementary bars of the diodes can have, for example, a diameter of 2 cm. and a length of 15 cm. which consequently correspond to an outer surface area of 94 sq. cm. For an emission density of 16 A./sq. cm. the total current produced by the diode is about 1500 A.; with a voltage between diodes of 0.5 v. a power of the order of 750 watts is therefore obtained available in an outside circuit.

The anode 34 is formed by a cylinder closed at both ends and coaxial with the elementary bars. The radial distance between the anode and bars is very small, for example of the order of 200 microns. This distance has been considerably increased in the drawings in order to render the latter more clear.

The anode 34 can be composed entirely of the same metal, for example niobium, having a thickness of 3 mm. and comprising in the parts thereof facing the gaps between elementary bars thinned-down or recessed portions 34a having a thickness of 0.13 mm. for example, connecting the portions 34b of normal thickness which surround the major part of the cylindrical surface of the respective bars. The ends of these thinned-down portions 34a extend in front of the end zones of the bars as shown in particular in FIG. 3 so as to insure that these portions have a temperature higher than that of the other thicker portions 34b of the anode tube.

In the following example, the calculated resistance of this thinned-down portion, bearing in mind a relative rise in temperature of 300° C., is 3.3 milliohms, which shunts a short-circuit of about ⅒ of the total current.

An entirely metallic and continuous tubular anode is thus obtained which is composed of the same metal without welding or soldering and this results in a high operational safety factor.

The aforementioned three successive diodes form a bar which is 55 cm. in length and whose specific electrical power is 2 kw. The assembly of these bars into a reactor is a conventional operation which forms no part of the present invention.

In order to reduce the magnitude of the current flowing through the electric shunts formed by the thinned-down portions there could be used for the construction of the anode certain other metals having a good electric resistance and good nuclear properties such as, for example, Mo, Ni, Pt, Re, Ru, W, Ti, Zr, Nb, or V, or their alloys and some of their compounds. In this way it is possible to obtain an electric resistivity of the order of 500 microhms/cm./sq. cm. at 1000° K., which makes it possible to employ an anode tube having in its thinned-down portions a thickness of 1 mm. Likewise, it is possible to reduce the length of these thinned down portions which are bad conductors.

It is also possible to form the thick portions and the thin portions of two different metals. In this case, the tube is no longer homogeneous but as it is exclusively composed of metal parts its strength remains much greater than that of bars composed of metal cylinders separated by insulators of ceramic. In fact, the joints between the metal pieces are achieved by means of welds obtained by electronic bombardment, which gives complete satisfaction from the point of view of fluidtightness and mechanical rigidity.

Further, the parts 34a of the tube 34 which are bad conductors could be constructed by a localized metallurgical treatment of the machined tube, for example nitriding or carburizing.

In the variant of the invention shown in FIG. 5, the edges of each thinned-down portion can be provided with an alloy which is fusible at, for example, 1300° K. and contains for example gold or nickel. This alloy is disposed in the form of a ring 51 surrounding the thinned-down portion 34a. This thinned-down portion is thereafter covered with a ceramic sleeve 52 whose sole purpose is to define a chamber 53 which encourages the possible fusion and spreading of the rings 51. Indeed, if for any reason one of the diodes of the bar shown in FIG. 3 became defective (for example breaking of the fuel or premature poisoning) and ceases to produce the nominal current for which it was designed, the output voltage of the assembly of the bars connected in series among those of which the reactor is composed is transferred to the terminals of the thinned-down portion relating to the diode in question. Consequently, there is an abnormal heating of said thinned-down portion which results in the fusion of the fusible deposit 51 which, as it is deposited on the thinned-down portion, short-circuits the latter and thus creates a by-pass path having a low impedance which allows the electric current to pass round the defective diode. There is thus achieved an automatic protection of the converter bar.

Said fusible deposit can be in the form of an annular band 61 (FIG. 6) this band being placed, depending on each case, inside or, as shown, outside the diode. This band is preferably disposed in the vicinity of an annular trough 62 which it will naturally fill by capillarity in the event of fusion, this device being operative even when there is no force of gravity. The outer lip or edge of said trough is composed of a metal which is a good conductor and is insulated from the fuse band 61 which, upon fusion, creates the electric contact between this lip and the tube 34b.

Although specific embodiments of the invention have been described, many modifications and changes may be made therein without departing from the scope of the invention as defined in the appended claims.

Having now described my invention what I claim as new and desire to secure by Letters Patent is:

1. A thermoelectric energy converter of the type comprising a composite combustible nuclear bar including a plurality of elementary nuclear fuel bars, a single continuous elongated anode common to the elementary bars and encompassing and coaxial with the composite bar, the elementary bars being individually electrically connected to the anode, a plasma of an easily ionizable gas disposed in the space between the composite bar and the anode, the anode being entirely composed of metal and comprising cylindrical portions respectively facing the elementary bars and constituting elementary anodes and intermediate annular portions having a radial wall thickness less than the radial wall thickness of the cylindrical portions and interconnecting the cylindrical portions, the radial wall thickness of the annular portions being such that the annular portions have in the axial direction a linear resistance greater than that of the cylindrical portions so that the short circuit current is restricted to an acceptable value.

2. A converter as claimed in claim 1, wherein the anode is composed of a metal having a good electric resistance and good nuclear properties.

3. A converter as claimed in claim 1, wherein the anode is composed of a metal selected from the group consisting of Mo, Ni, Pt, Re, Ru, W, Ti, Zr, V, Nb, and the alloys and compounds thereof.

4. A thermoelectronic energy converter of the type comprising a composite nuclear fuel bar including a plurality of elementary nuclear fuel bars, a single continuous elongated anode common to the elementary bars and encompassing and coaxial with the composite bar, the elementary bars being individually electrically connected to the anode, a plasma of an easily ionizable gas disposed in the space between the composite bar and the anode, the anode being entirely composed of metal, and comprising cylindrical portions respectively facing the elementary bars and constituting elementary anodes and intermediate annular portions having a radial wall thickness less than the radial wall thickness of the cylindrical portions and interconnecting the cylindrical portions, the metal of the annular portions being different from the metal of the cylindrical portions, the radial wall thickness of the annular portions being such that the annular portions have in the axial direction a linear resistance greater than that of the cylindrical portions so that the short-circuit current is restricted to an acceptable value.

5. A thermoelectronic energy converter of the type comprising a composite combustible nuclear bar including a plurality of elementary combustible nuclear bars, a single continuous elongated anode common to the elementary bars and encompassing and coaxial with the composite bar, the elementary bars being individually electrically connected to the anode, a plasma of an easily ionizable gas disposed in the space between the composite bar and the anode, the anode being entirely composed of metal, and comprising cylindrical portions respectively facing the elementary bars and constituting elementary anodes and intermediate annular portions having a radial wall thickness less than the radial wall thickness of the cylindrical portions and interconnecting the cylindrical portions, the metal of the annular portions being composed of the metal of the cylindrical portions which has undergone a local treatment so that its electric resistivity is modified, the radial wall thickness of the annular portions being such that the annular portions have in the axial direction a linear resistance greater than that of the cylindrical portions so that the shortcircuit current is restricted to an acceptable value.

6. A converter as claimed in claim 5, wherein the treatment is a metallurgical treatment.

7. A converter as claimed in claim 5, wherein the treatment is a chemical treatment.

8. A thermoelectronic energy converter of the type comprising a composite nuclear fuel bar including a plurality of elementary nuclear fuel bars, a single continuous elongated anode common to the elementary bars and encompassing and coaxial with the composite bar, the elementary bars being individually electrically connected to the anode, a plasma of an easily ionizable gas disposed in the space between the composite bar and the anode, the anode being entirely composed of metal, and comprising cylindrical portions respectively facing the elementary bars and constituting elementary anodes and intermediate annular portions having a radial wall thickness less than the radial wall thickness of the cylindrical portions and interconnecting the cylindrical portions, the radial wall thickness of the annular portions being such that the annular portions have in the axial direction a linear resistance greater than that of the cylindrical portions so that the short-circuit current is restricted to an acceptable value, the converter further comprising rings of metal encompassing the annular portions, the metal of the rings being fusible at a temperature substantially higher than that of normal operation and being adapted to spread over the cylindrical surface of the annular portions in the event that the temperature of the annular portions rises excessively.

9. A thermoelectronic energy converter of the type comprising a composite combustible nuclear bar including a plurality of elementary nuclear fuel bars, a single continuous elongated anode common to the elementary bars and encompassing and coaxial with the composite bar, the elementary bars being individually electrically connected to the anode, a plasma of an easily ionizable gas disposed in the space between the composite bar and the anode, the anode being entirely composed of metal, and comprising cylindrical portions respectively facing the elementary bars and constituting elementary anodes and intermediate annular portions having a radial wall thickness less than the radial wall thickness of the cylindrical portion and interconnecting the cylindrical portions, the radial wall thickness of the annular portions being such that the annular portions have in the axial direction a linear resistance greater than that of the cylindrical portions so that the short-circuit current is restricted to an acceptable value, the converter further comprising rings of metal encompassing annular portions, the metal of the rings being fusible at a temperature substantially higher than that of normal operation and being adapted to spread over the cylindrical surface of the annular portions in the event that the temperature of the annular portions rises excessively, and an insulating ring encompassing the rings and forming about the annular portion an annular chamber for receiving the molten metal.

10. A converter as claimed in claim 8, wherein a single ring encompasses each annular portion and an annular trough encompasses each annular portion at a short radial distance from the latter, the single ring being located adjacent the open end of the trough so as to fill the trough by capillarity when the metal of the ring melts.

No references cited.

MILTON O. HIRSHFIELD, *Primary Examiner.*

J. W. GIBBS, *Assistant Examiner.*